United States Patent
Parker et al.

(10) Patent No.: US 11,073,174 B2
(45) Date of Patent: Jul. 27, 2021

(54) FENCING STAPLE

(71) Applicant: Black & Decker, Inc., New Britain, CT (US)

(72) Inventors: Dylan Parker, Towson, MD (US); Jeffrey J. Meyer, Los Gatos, CA (US)

(73) Assignee: Black & Decker, Inc., New Britain, CT (US)

( * ) Notice: Subject to any disclaimer, the term of this patent is extended or adjusted under 35 U.S.C. 154(b) by 245 days.

(21) Appl. No.: 15/959,360

(22) Filed: Apr. 23, 2018

(65) Prior Publication Data

US 2019/0120271 A1   Apr. 25, 2019

Related U.S. Application Data (60) Provisional application No. 62/489,885, filed on Apr. 25, 2017.

(51) Int. Cl.
  *F16B 15/00* (2006.01)
  *F16B 15/06* (2006.01)
  *F16B 15/08* (2006.01)

(52) U.S. Cl.
  CPC .......... *F16B 15/06* (2013.01); *F16B 15/0015* (2013.01); *F16B 15/08* (2013.01)

(58) Field of Classification Search
  CPC ....... F16B 15/0015; F16B 15/08; F16B 15/06
  USPC ..................... 411/920, 921, 922, 456, 451.3
  See application file for complete search history.

(56) References Cited

U.S. PATENT DOCUMENTS

| | | | |
|---|---|---|---|
| 770,479 A * | 9/1904 | Shuster | B65D 9/34 |
| | | | 217/93 |
| 1,311,903 A | 8/1919 | Leschander | |
| 1,543,764 A * | 6/1925 | Garford | E04H 17/10 |
| | | | 256/53 |
| 1,574,790 A | 3/1926 | Carroll | |
| 2,236,581 A | 4/1941 | Schenck | |
| 2,390,219 A | 12/1945 | La Place | |
| 2,528,685 A * | 11/1950 | Brown | E04H 17/10 |
| | | | 411/472 |
| 2,648,065 A | 8/1953 | Stichs | |
| 2,758,302 A | 8/1956 | White | |
| 2,867,807 A | 1/1959 | Anstett | |

(Continued)

FOREIGN PATENT DOCUMENTS

| DE | 1930490 | 12/1970 |
|---|---|---|
| DE | 102013011804 | 1/2015 |

(Continued)

OTHER PUBLICATIONS

Extended European Search Report dated Sep. 18, 2018.

*Primary Examiner* — Flemming Saether
(74) *Attorney, Agent, or Firm* — Rhonda Barton (57) ABSTRACT

A barbed staple for installing fencing wire onto a fence post. The staple has a crown section and a leg section. The crown section has an arcuate crown portion and a radiused portion, and the leg section has a pair of leg portions that extend in parallel from the radiused portion of the crown section. At least one barb protrudes from each of the leg portions, the barb having projecting points. The distance between the distal edge of the projecting points defines an outer leg width. The crown portion of the crown section has a greater width than the pair of leg portions in parallel. The outer crown width is greater than the outer leg width.

16 Claims, 6 Drawing Sheets

(56) References Cited

U.S. PATENT DOCUMENTS

| | | | |
|---|---|---|---|
| 3,618,447 A * | 11/1971 | Goins | F16B 15/0015 |
| | | | 411/456 |
| 4,114,859 A | 9/1978 | Stenson | |
| 4,697,045 A * | 9/1987 | Beatty | F16B 15/0015 |
| | | | 174/159 |
| 4,787,387 A | 11/1988 | Burbank, III et al. | |
| 4,836,372 A * | 6/1989 | Shelton | F16B 15/08 |
| | | | 206/344 |
| 4,994,073 A | 2/1991 | Green | |
| 5,695,524 A | 12/1997 | Kelley et al. | |
| 6,024,267 A | 2/2000 | Chen | |
| 8,464,806 B2 | 6/2013 | Rousson et al. | |
| 9,121,427 B2 | 9/2015 | Young | |
| 9,427,857 B2 | 8/2016 | Kok | |
| 10,563,685 B2 * | 2/2020 | Tao | F16B 15/08 |
| 2003/0021655 A1 | 1/2003 | Correll | |

FOREIGN PATENT DOCUMENTS

| | | |
|---|---|---|
| EP | 1493930 | 1/2005 |
| GB | 2154688 | 9/1985 |
| JP | 2004245335 | 9/2004 |
| WO | 2009096395 A1 | 8/2009 |
| WO | 2012111466 A1 | 8/2012 |

\* cited by examiner

FENCING STAPLE

CROSS-REFERENCE TO RELATED APPLICATIONS

The present invention claims priority under 35 U.S.C. § 119 to U.S. Provisional Application Ser. No. 62/489,885 entitled "Fencing Staple" filed on Apr. 25, 2017, which is hereby incorporated by reference in its entirety.

BACKGROUND OF THE INVENTION

Field of the Invention

The present invention relates, in general, to the field of staples used in power tools. In particular, the present invention relates to staples that securely enhance the grip of a staple in a workpiece, such as a fence post.

Description of the Related Art

Fences are generally constructed from wood. As an alternative to barbed wire fencing, which are likely to cause lacerations and other injury to persons and livestock, smooth wire fencing can be used. Smooth wire fencing can be fixed to the fencing posts by fencing staples having barbs. Fencing staples are generally installed into fencing posts individually.

To maintain control of collated staples on the magazine rail, most staple designs require two pieces or geometries to control the staples. For example, most staple tools have a cover over the rail to maintain collated staple control. Such a cover can inhibit line of sight to the workpiece or staples. Accordingly, three is a need in the art for a staple that can maintain a consistent orientation as the staple moves through the fastening tool. Accordingly, there is also a need in the art for a fencing staple that can be reliably driven by a powered fastening tool into a fencing post.

SUMMARY OF THE INVENTION

In an embodiment of the present invention, a fencing staple for driving into a workpiece, such as a fence post includes a crown section and a leg section. The crown section includes a crown portion having an outer crown width and at least one radiused portion extending from the crown portion. The leg section includes a pair of leg portions extending from the at least one radiused portion of the crown section. The leg section also includes at least one barb protruding from each of the pair of leg portions. The at least one barb protrudes from each of the pair of leg portions. The at least one barb has a projecting point that defines a distal edge of the barb. The distance between the distal edge of the barbs on opposing leg portions defining an outer leg width. The outer crown width is greater than the outer leg width.

To facilitate the use of fencing staples by pneumatic or electrically powered fastening tools, such as powered stapling tools, and in constructing fences, staples can be serially collated. For example, individual staples can be joined together form strips of staple assemblies that can be easily inserted into and used by such fastening tools.

The present invention also allows the user to load a plurality of serially arranged staples into a fastening tool and drive a lead staple from the tool into the fencing posts. Subsequent staples in the staple assembly are held in the fastening tool and fed to the nosepiece of the fastening tool for the next staple installation.

Collating the staples allows the fastening tool to maintain control of the staples on the magazine rail and maintain control of individual staples in the drive channel and during a drive event.

In this regard, an embodiment of the present invention includes a collated staple assembly for use with a staple fastening tool having a driving blade. The collated staple assembly includes a plurality of staples. Each staple has a crown section, the crown section including a crown portion having an outer crown width and at least one radiused portion extending from opposite ends of the crown portion. Each staple also includes a pair of leg portions extending from opposite ends of the at least one radiused portion. At least one barb protrudes from each of the leg portions. The at least one barb protruding from each of the leg portions. The at least one barb having a projecting point that defines a distal edge of the barb. The distance between the distal edge of the barbs on opposing leg portions defining an outer leg width that is less than the outer crown width. An adhesive material formed from a frangible material is arranged to connect adjacent pairs of staples along the pair of leg portions.

Fastening tools, such as power nailers can be used to drive the staple embodiments illustrated herein. Such fastening tools include pneumatically-powered nailers, which are connected to an air compressor via an air hose, and powder nailers, which employ a powder fuel source that is rapidly combusted to produce a volume of pressurized gas, initially dominated the market and cordless electric nailers, which can be battery powered can be used to drive the fencing staple.

BRIEF DESCRIPTION OF THE DRAWINGS

The numerous advantages of the present invention may be better understood by those skilled in the art by reference to the accompanying Figures.

Corresponding reference numerals indicate corresponding parts throughout the several views of the drawings.

DETAILED DESCRIPTION OF THE INVENTION

Reference will now be made in detail to the presently preferred embodiments of the invention, examples of which are illustrated in the accompanying drawings.

Figure 1:
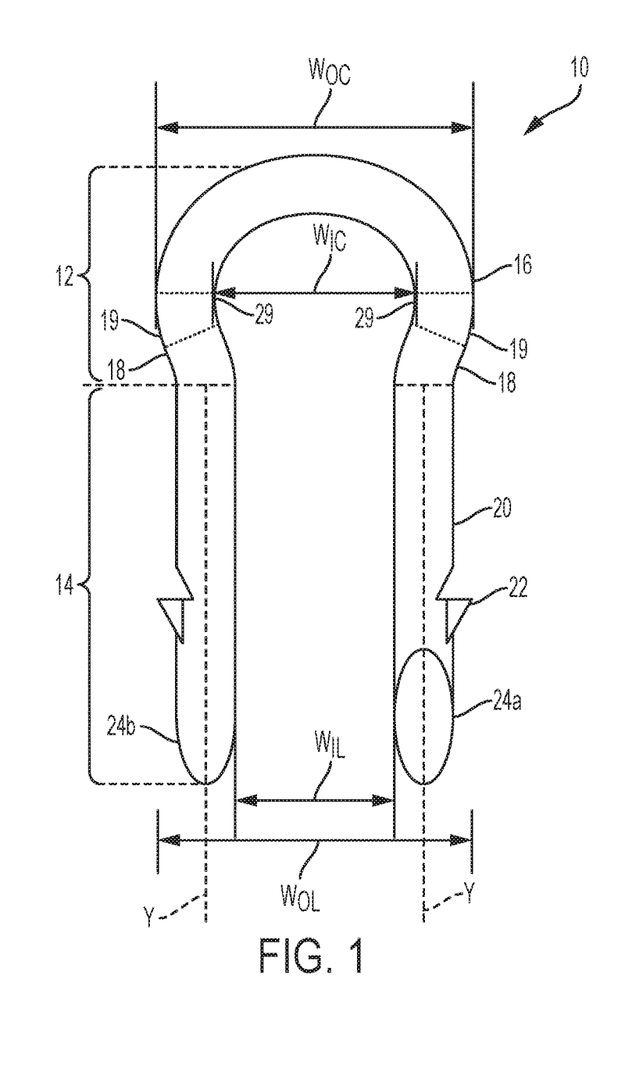
FIG. 1 illustrates a front view of an exemplary staple constructed according to a first embodiment of the present invention.
Figures 2, 3:
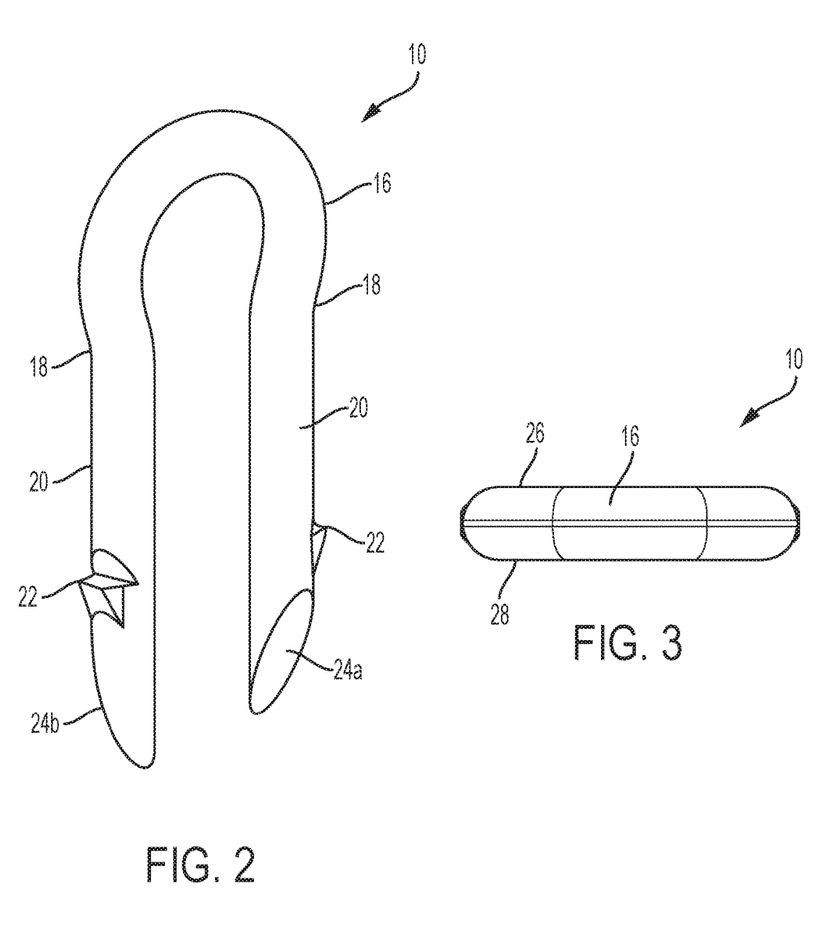
FIG. 2 illustrates a perspective view of the staple FIG. 1.
FIG. 3 illustrates a top view of the staple of FIG. 1.
Figure 4A:
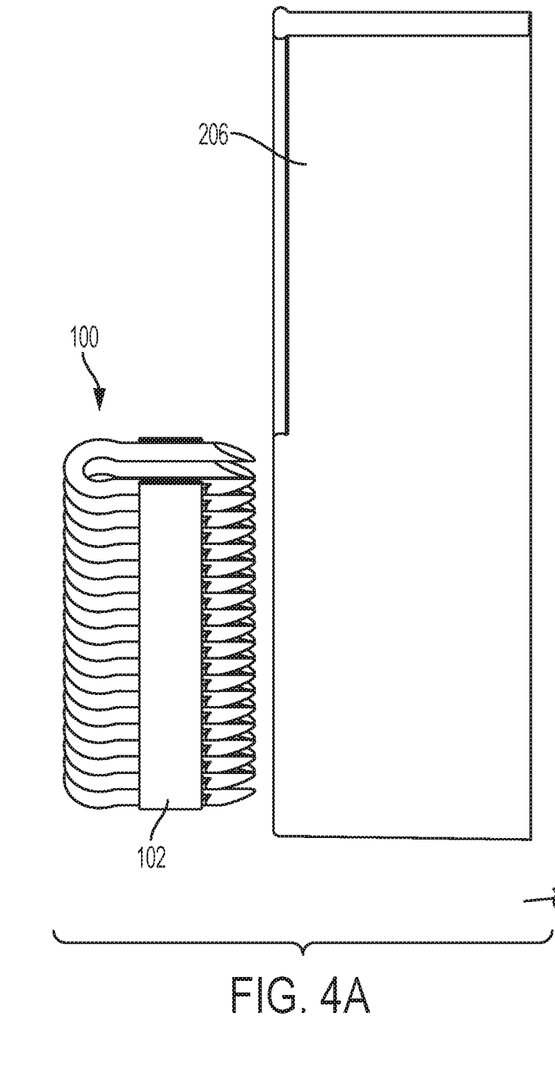
FIGS. 4A-4D illustrate an assembly of collated staples according to the embodiment of FIG. 1.
Figure 4B:
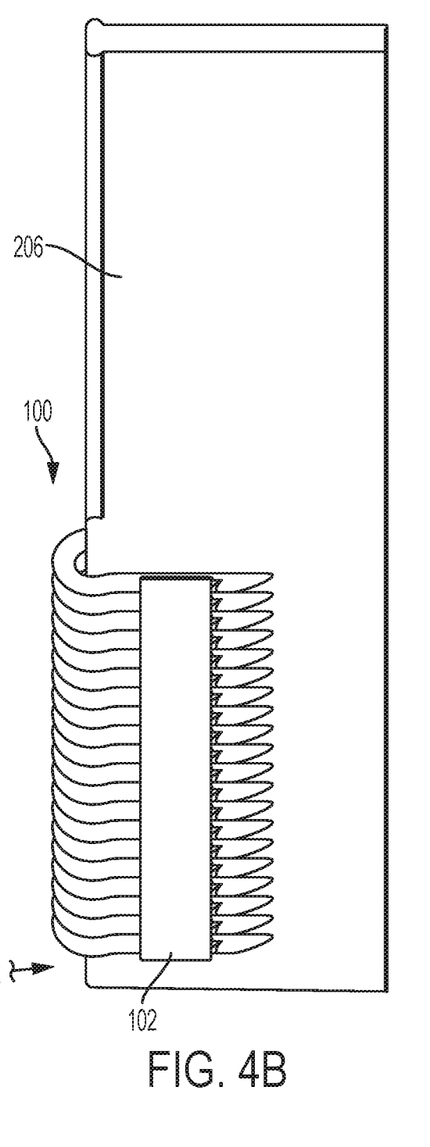
Figure 4C:
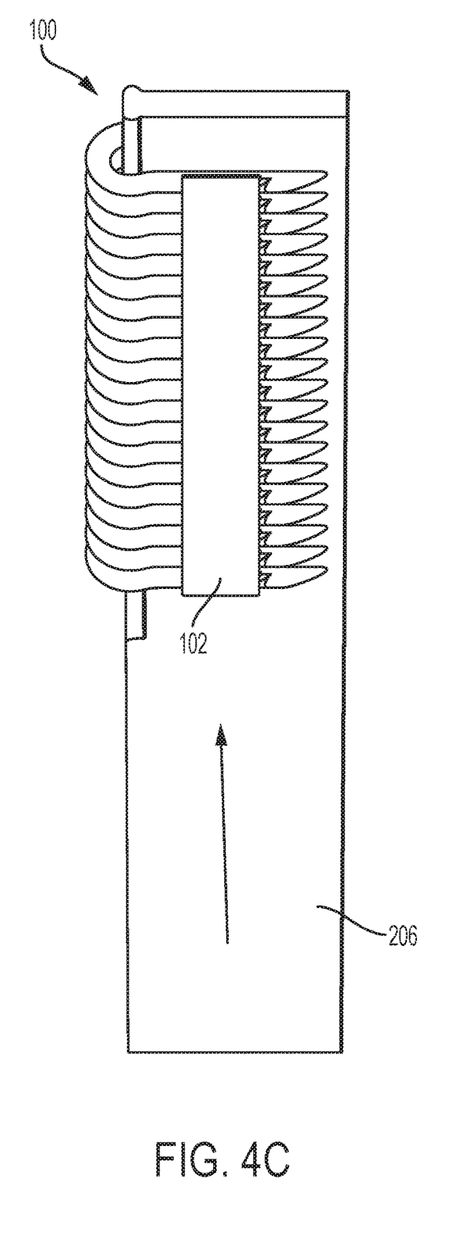
Figure 4D:
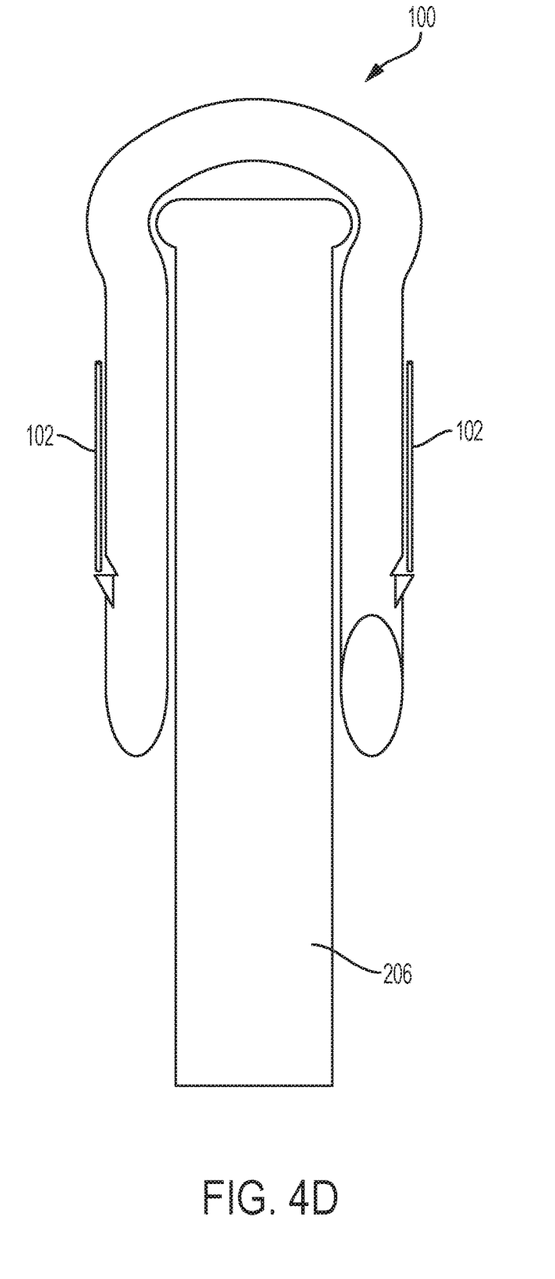

In accordance with an embodiment of the invention, FIGS. 1-3 illustrate a staple that can be used to secure a wire to a fence post or workpiece (not shown). The staple 10 includes a crown section 12 and a leg section 14. In an embodiment of the present invention, the staple 10 can have an overall a shape of, for example, a mushroom. In an embodiment of the present invention, the crown section 12 can have an overall arcuate shape, such as for example, the shape of a mushroom cap.

The crown section 12 includes a crown portion 16 and radiused portions 18, 19. The crown portion has a substantially arcuate or semi-circular shape. In an embodiment, the shape is of a half-ellipse or semi-elliptical. The radiused portions 18, 19 of the crown can have a different curvature than that of the crown portion 16. The radiused portions 18, 19 can also have different curvatures from each other. For example, the radiused portion 18 can have a different arc from the radiused portion 19. The radiused portions 18, 19 are disposed between the crown portion 16 of the crown section 12 and the leg section 14 of the staple 10.

The leg section 14 includes parallel leg portions 20. The leg portions 20 extend from the radiused portions 18, 19.

Each leg portion 20 can include a barb 22 that projects outwardly of the leg portion in a widthwise direction. The barb 22 includes projecting points that grip the inner portion of the workpiece to inhibit extraction of the staple.

The distal end of each leg portion 20 opposite of the crown section, includes point that securely retains the staple 10 in the fence post or workpiece. As illustrated, in FIGS. 1 and 2, there are two points, a forward point 24a and a rearward point 24b. The forward point 24a is illustrated as disposed on one of the leg portions and the rearward point 24b is illustrated as disposed on the other one of the leg portions. The points 24a, 24b can be in the form of divergent points that securely retain the staple 10 in the workpiece where high holding power to the workpiece is required. Divergent points are specially cut points that, during impact, guide the leg portions 20 in a curved or arcuate path, instead of linearly or straight into the workpiece. The forward point 24a has an inclined or tapered surface that faces toward the front or leading side 26 of the staple while the rearward point 24b has an inclined or tapered surface that faces toward the rear or trailing side 28 of the staple. Each point can form an inclined or tapered surface with respect to the Y-axis of the leg to form a sharp edge at the distal free end of the point. In an example, the points can be angled 25 degrees with respect to the Y-axis of the leg.

In an embodiment, the staple has a single inclined or tapered surface forming a point as shown in FIG. 1. In alternative embodiments, the staple can have a plurality of tapered surfaces.

In an embodiment of the present invention, the crown portion 16 has an outer width that is greater than the outer width of the leg section 14. In particular, the crown section 12 has an outer crown width $W_{OC}$ and an inner crown width $W_{IC}$. The outer crown width is the maximum width of crown portion 16 measured along a plane perpendicular to the Y-axis of the leg portion, or the distance between the outermost widthwise edges of the crown portion. The width of the leg section or outer leg width $W_{OL}$, is defined by the distance between the outermost barbs 22 that project widthwise from the leg portion 20. The outer crown width $W_{OC}$ is greater than the outer leg width $W_{OL}$. The inner crown width $W_{IC}$ is the maximum width of the inside of the crown portion 16 measured along a plane perpendicular to the Y-axis of the leg portion 20. In addition, the inner crown width $W_{IC}$ is greater than the inner leg width $W_{IL}$. The inner leg width is defined by the horizontal distance between the parallel leg portions 20, as illustrated in FIG. 1. The inner crown width $W_{IC}$ being greater than the inner leg width $W_{IL}$ results in a staple having recesses 29 on the inside of the crown section. The recesses 29 support and stabilize the staple along the magazine in the fastening tool. The recesses 29 also provide a guiding surface for guiding the staple along the magazine. In an embodiment, the recesses are symmetrically arranged in the staple crown section 12.

In an embodiment of the present invention, the staple 10 can have a circular cross-section. In an alternative embodiment, opposite sides, such as the leading side 26 and trailing side 28 can be planar.

The staple 10 can be formed from any material including, but not limited to, a metal. In an embodiment, a metal wire formed from a material such as 1040 steel, can be used. The staple 10 can also have a coating including, but not limited to, zinc or an aluminum-zinc coating. The leg portion 20 can include a withdrawal coating or adhesive to help maintain the staple in the workpiece.

As shown in FIGS. 4A-4D, individual staples 10 can be formed into a collated staple assembly 100. The collated staple assembly 100 can be mounted on a magazine rail 206 of a fastening tool.

In embodiments of the present invention, the shape of the crown portion and the recesses 29 on the inner surface thereof serve to support the staple at a consistent orientation for engaging with the driver and prevent the staple from laterally rocking as the staple moves along the magazine rail 206 toward the nosepiece in a powered fastening tool. In an embodiment, the magazine rail 206 is illustrated as T-shaped. The T-shaped rail engages the portions of the staple defined by the inner crown width $W_{IC}$, and in particular, the inner crown recesses 29. The arcuate shape of the crown portion 16 allows the staple to be self-stabilizing on the magazine rail 206, resulting in a reduced the weight of the magazine and thereby, the fastening tool. Additionally a staple assembly that does not require a cover for stability reduces the fastening tool parts complexity, and the number of parts required for the fastening tool to drive the staple.

The staples 10 in the staple assembly 100 shown in FIGS. 4A-4D can be collated by arranging the rear face or trailing side 28 of a first or lead staple to the front face or leading side 26 of a second or subsequent staple. The staple assembly 100 can be held together by bonding adjacent individual staples with a collation member, such as an adhesive or frangible material, therebetween. Alternatively, the individual staples can be collated by an adhesive material, such as paper tape 102, along the outer sides of the leg portions. Further collation systems can include plastic collation members or wire weld members.

Figure 5:
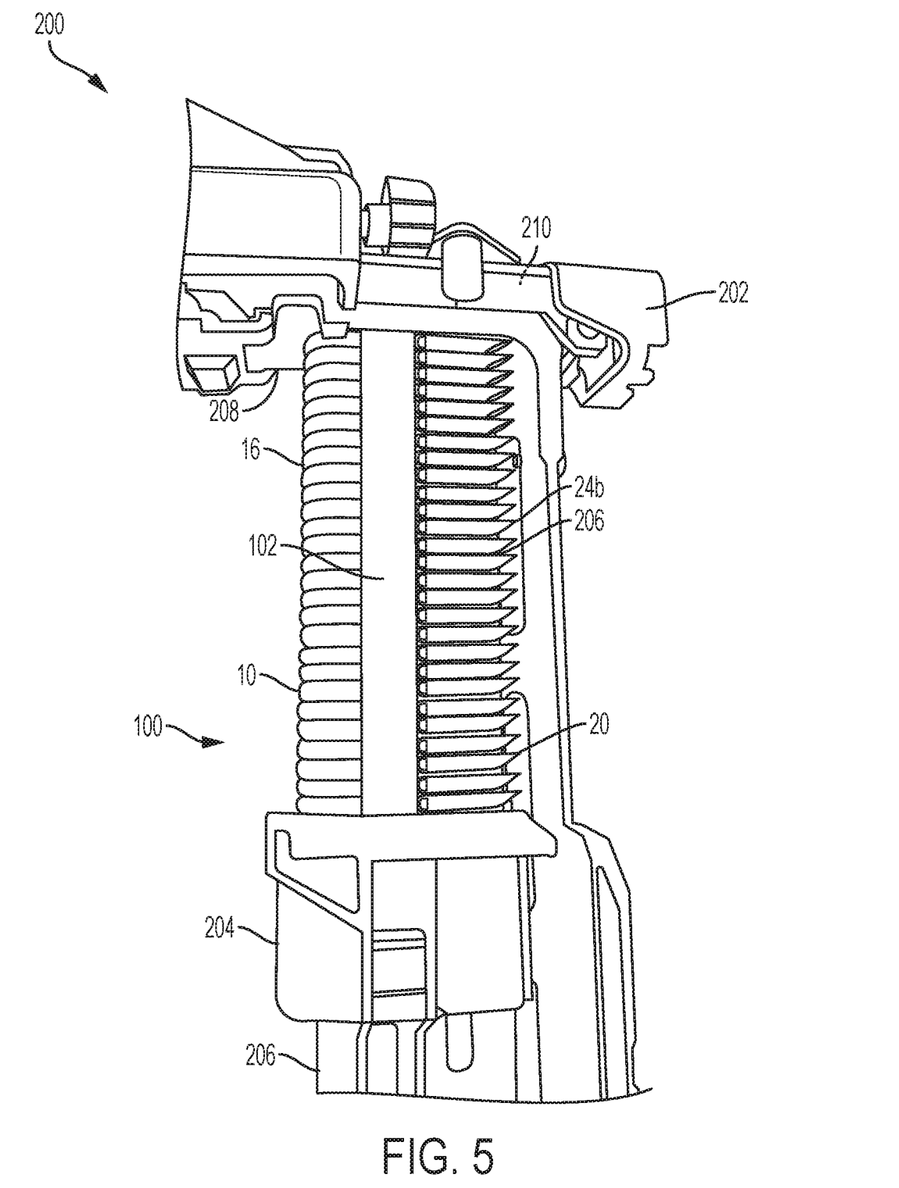
FIG. 5 illustrates a portion of a fastening tool including the assembly of collated staples according to the embodiment of FIG. 1.

In operation, the fencing staple 10 and/or staple assembly 100, can be stored in the housing and magazine of a fastening tool, such as fastening tool 200 shown in FIG. 5.

As shown in FIG. 5, the staples are sequentially fed forward into a nosepiece 202 of the fastening tool 200 by a pusher 204 on the magazine 206. Under pneumatic, electrical or other source of power, a fastening tool driver blade (not shown) translates to impact the forwardmost or lead staple of the staple assembly 100 that resides in the nosepiece 202 so that each staple 10 may be driven into the workpiece.

In addition to the control provided by the inner surface recesses 29 of the staple, in an embodiment, the outer surface of the crown can be used to maintain control of the staples 10 during a drive event by engaging the staple channel 208 in the drive path 210. The barbs 22 can act as secondary engagement members to keep the staple 10 parallel to the drive path 210. However, the collation tape 102 is free from contact with any portion of the fastening tool 200.

Figure 6:
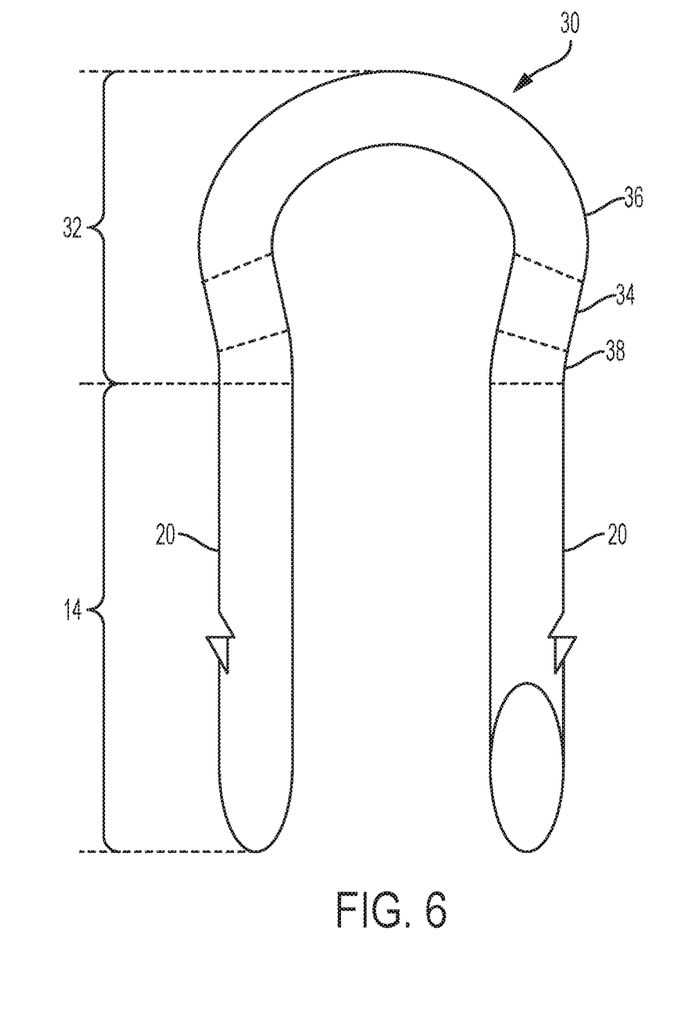
FIG. 6 illustrates a front view of an exemplary staple constructed according to a second embodiment of the present invention.

FIG. 6 illustrates a second embodiment of the staple of the present invention. As shown, the staple 30 includes a crown section 32 that has a straight 34 and curved 38 radiused portions between a crown portion 36 and the leg portions 20. The leg portions 20 are the same as the leg portions 20 in the embodiment of FIG. 1.

Figure 7:
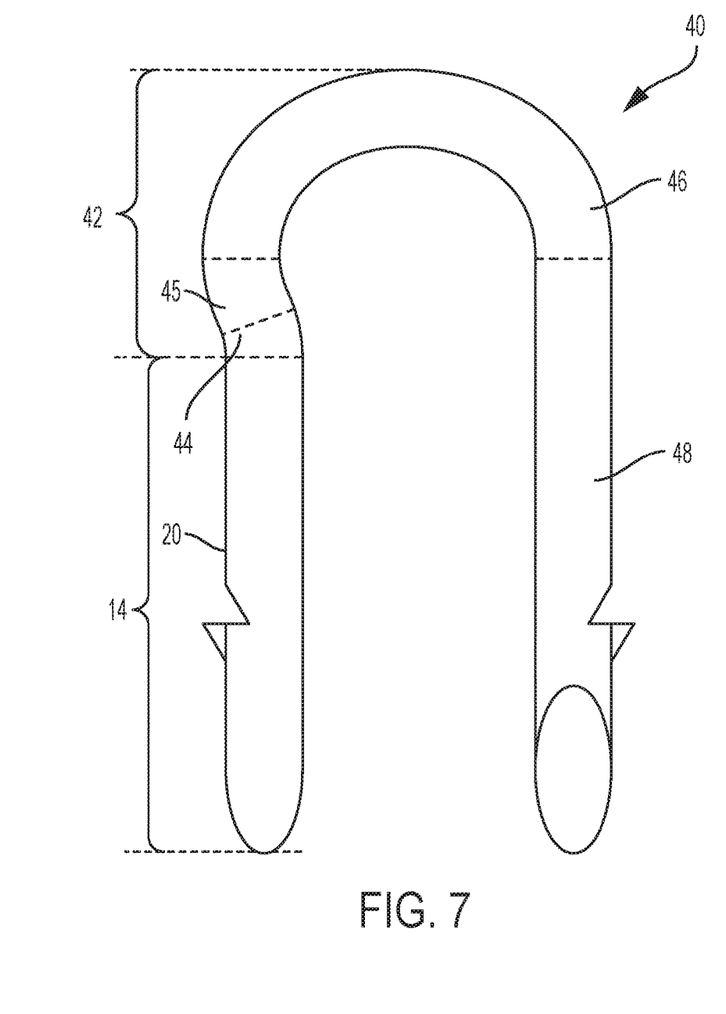
FIG. 7 illustrates a front view of an exemplary staple constructed according to a third embodiment of the present invention.

FIG. 7 illustrates a third embodiment of the staple of the present invention. In this embodiment, one side of the crown section 42 includes radiused portions 44 and 45. On the other side of the crown section, the end of the crown portion 46 connects to an extended leg portion 48. The other leg portion 20 is the same as the leg portion 20 in the embodiment of FIG. 1. As shown, the staple 40 includes a crown portion 16 that has a half-elliptical shape.

Figure 8A:
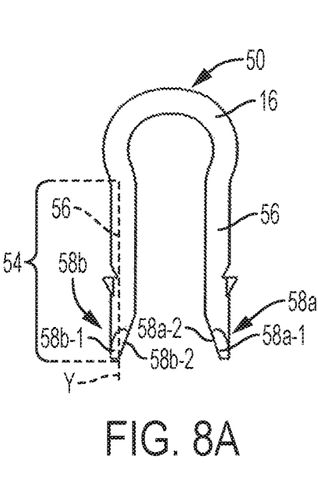
FIGS. 8A-C illustrate front, perspective and top views, respectively, of an exemplary staple constructed according to a fourth embodiment of the present invention.
Figure 8B:
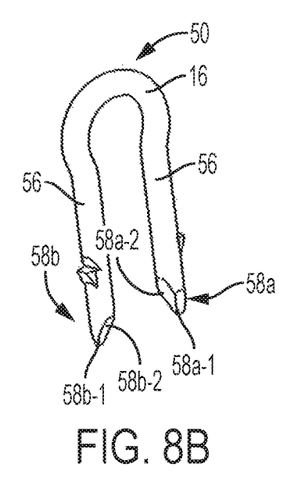
Figure 8C:
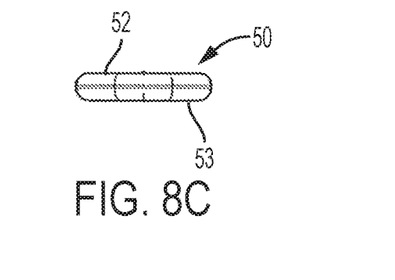

FIGS. 8A-8C illustrate a fourth embodiment of the staple of the present invention in which the staple leg portions end in divergent chisel points. As shown, the staple 50 includes the same crown section 12 and crown portion 16 as in the embodiment of FIG. 1. The staple 50 has a leading side 52 and a trailing side 53. The leg section 54 of the staple 50 includes a parallel leg portions 56. The end of each leg portion 56 opposite of the crown section, includes tip or point that securely retains the staple 50 in the workpiece. As illustrated, there are two points in the form of divergent chisel points. A first chisel point 58a is illustrated as disposed on one of the leg portions 56 and a second chisel point 58b is illustrated as disposed on the other one of the leg portions 56. The chisel points 58a and 58b have corresponding beveled surfaces 58a-2 and 58b-2 that are configured to diverge away from each other when the staple is driven into the workpiece. In this regard, the surfaces of the chisel points 58a and 58b are inclined or tapered away from each other in a direction from the crown portion 16 toward the distal end of each leg portion 56.

Each chisel point 58a, 58b forms at least one inclined or tapered surface with respect to the Y-axis of the leg. In an example, the chisel points can be angled 25 degrees with respect to the Y-axis of the leg.

The chisel point helps to preserve the structure of the driver blade or profile. For example, after a lead staple is driven and the driver blade returns to the home position for the driving the next staple, the magazine pusher 204 pushes the remaining collated assembly of staples 100 against the driver blade (not shown). The chisel point shape prevents the sharp or driving edge 58a, 58b of the staple from contacting the surface of the moving profile portion of the driver when the driver returns to the home position for the driving the next staple. As such, the driver blade remains free from possible scrapes to the surface.

Figure 9A:
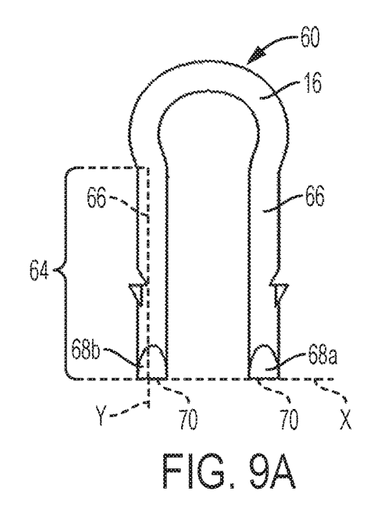
FIGS. 9A-9C illustrate front, perspective and top views, respectively, of an exemplary staple constructed according to a fifth embodiment of the present invention.
Figure 9B:
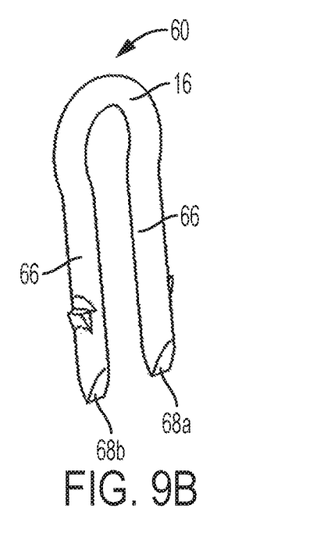
Figure 9C:
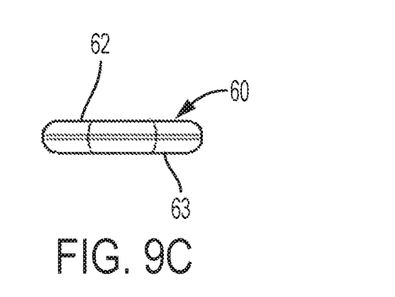

FIGS. 9A-9C illustrate a fifth embodiment of the staple of the present invention. As shown, the staple 60 includes the same crown section 12 and crown portion 16 as in the embodiment of FIG. 1. The staple 60 has a leading side 62 and a trailing side 63. The leg section 64 of the staple 60 includes parallel leg portions 66.

The end of each leg portion 66 opposite of the crown section, includes a point that securely retains the staple 60 in the workpiece. As illustrated, there are two points in the form of divergent chisel points that securely retain the staple in the workpiece. A first chisel point 68a is illustrated as disposed on one of the leg portions and a second chisel point 68b is illustrated as disposed on the other one of the leg portions. The surfaces of the chisel points 68a and 68b are beveled or tapered with respect to the Y-axis in a direction from the crown portion 16 toward the distal end of each leg portion 66.

Each point 68a, 68b also forms an inclined surface with respect to the Y-axis of the leg. In an example, the points can be angled 25 degrees with respect to the Y-axis of the leg. In addition, the chisel points 68a and 68b are configured to have a flat edge 70 along the X-axis that cuts into the workpiece when the staple 60 is driven.

The plurality of staples can include the embodiments of FIGS. 1 and 6-9. The inventive fencing staple can be used in a variety of nailers and/or other fastening tools such as the stapling tool disclosed in U.S. patent application Ser. No. 15/941,432 entitled "A Stapling Tool Assembly Including A Wire Alignment Contact Trip", which is incorporated by reference in its entirety.

While aspects of the present invention are described herein and illustrated in the accompanying drawings in the context of a fastening tool, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

We claim:

1. A staple comprising:
    a crown section including a crown portion having a semi-circular shape, an outer crown width and an inner crown width defining a recess in the crown portion;
    at least one radiused portion extending from the crown portion;
    a leg section including a pair of leg portions, each leg portion extending from the at least one radiused portion of the crown section and each leg portion having an inner surface and an outer surface; and
    at least one barb protruding from each of the pair of leg portions, the at least one barb having a projecting point that defines a distal edge of the barb, the distance between the distal edges of the barbs on the pair of leg portions defining an outer leg width,
    wherein the outer crown width is greater than the outer leg width, and
    wherein the outer surface of each leg portion lies in a plane that passes through only the crown portion while the inner surface of each leg portion lies in a plane that passes through both the crown portion and the recess; and wherein the plane of the outer surface of each leg portion is parallel to the plane of the inner surface of each leg portion along the entire length thereof.

2. The staple according to claim 1, wherein the staple has a circular cross-section.

3. The staple according to claim 1, wherein the pair of leg portions is arranged in parallel and define an inner leg width therebetween.

4. The staple according to claim 3, wherein the crown has an inner crown width that is less than the outer crown width and greater than an inner leg width.

5. The staple according to claim 1, wherein the at least one radiused portion comprises at least one arc having a different curvature than the curvature of the crown portion.

6. The staple according to claim 1, wherein the at least one radiused portion comprises a straight portion extending from the crown portion and an arc portion extending from the straight portion.

7. The staple according to claim 1, wherein the at least one radiused portion comprises a first arc portion extending from the crown portion and a second arc portion extending from the first arc portion.

8. The staple according to claim 1, wherein the crown portion serves as a guide surface along a magazine rail of a tool.

9. The staple according to claim 1, wherein an inner surface of the crown portion serves as a guide surface along a magazine rail of a tool.

10. The staple according to claim 1, wherein the at least one barb, on one leg portion, protrudes only in an opposite direction away from the at least one barb on the other leg portion.

11. The staple according to claim 1, having an overall shape of a mushroom.

12. A collated staple assembly for use with a staple fastening tool having a driving blade, the collated staple assembly comprising:

a plurality of staples arranged in an array, each staple having:
   a crown section including a crown portion having a semi-circular shape, an outer crown width and an inner crown width defining a recess in the crown portion;
   at least one radiused portion extending from opposite ends of the crown portion;
   a pair of leg portions, each leg portion extending from opposite ends of the at least one radiused portion, each leg portion having an inner surface and an outer surface;
   at least one barb protruding from each of the leg portions, the at least one barb having a projecting point that defines a distal edge of the barb, the distance between the distal edges of the barbs on the pair of leg portions defining an outer leg width that is less than the outer crown width; and
an adhesive material formed from a frangible material and arranged to connect adjacent pairs of staples along the pair of leg portions,
wherein the outer surface of each leg portion lies in a plane that passes through only the crown portion while the inner surface of each leg portion lies in a plane that passes through both the crown portion and the recess.

13. The collated staple assembly according to claim 12, wherein the adhesive material comprises at least one strip of collation tape.

14. The collated staple assembly according to claim 13, wherein the adhesive material is secured to the pair of leg portions of the staples and disposed between the at least one radiused portion and the at least one barb of the staples.

15. The collated staple assembly according to claim 13, wherein the collation tape is free from contact with any portion of the fastening tool.

16. The collated staple assembly according to claim 12, wherein the at least one barb, on one leg portion, protrudes only in an opposite direction away from the at least one barb on the other leg portion.

\* \* \* \* \*